Q. A. BRACKETT.
INERTIA ACTUATED CHARGING DEVICE FOR ELECTROLYTIC LIGHTNING ARRESTERS.
APPLICATION FILED SEPT. 6, 1913.

1,274,670.

Patented Aug. 6, 1918.

WITNESSES:
Fred A. Lind.
Geo. W. Hansen.

INVENTOR
Quincy A. Brackett
BY
Wesley G. Carr
ATTORNEY

UNITED STATES PATENT OFFICE.

QUINCY A. BRACKETT, OF PITTSBURGH, PENNSYLVANIA, ASSIGNOR TO WESTINGHOUSE ELECTRIC AND MANUFACTURING COMPANY, A CORPORATION OF PENNSYLVANIA.

INERTIA-ACTUATED CHARGING DEVICE FOR ELECTROLYTIC LIGHTNING-ARRESTERS.

1,274,670.　　　　　Specification of Letters Patent.　　Patented Aug. 6, 1918.

Application filed September 6, 1913. Serial No. 788,384.

*To all whom it may concern:*

Be it known that I, QUINCY A. BRACKETT, a citizen of the United States, and a resident of Pittsburgh, in the county of Allegheny and State of Pennsylvania, have invented a new and useful Improvement in Inertia-Actuated Charging Devices for Electrolytic Lightning-Arresters, of which the following is a specification.

My invention relates to electrical circuit closers, and has special reference to such devices as are employed for charging electrolytic lightning arresters.

More particularly, my invention relates to devices for automatically charging aluminum electrolytic lightning arresters which are mounted upon moving vehicles in order to protect the electrical apparatus associated therewith, as, for instance, the electrical apparatus of a railway vehicle.

Electrolytic lightning arresters are well known in the art, and, therefore, a detailed description of the same is not necessary. Briefly, an arrester or cell of the character above indicated comprises aluminum electrode plates spaced apart and immersed in a suitable electrolyte. When a direct current flows through the cell, it establishes insulating films upon the anodes, or positive electrodes, which immediately insulate the said electrode plates from the electrolyte, thereby choking back the current, unless the voltage impressd upon the cell exceeds a critical break-down voltage. If the last-named condition obtains, the insulating films will be punctured, thus permitting the charge to flow freely to ground. Of course, if the arrester is connected to an alternating current circuit, the insulating films will form upon both electrodes, and their function and action will be the same as hereinbefore mentioned.

In order to maintain the high-resistance qualities of the films formed upon the electrodes of the arrester, it is necessary to charge the cell to build up or reform the films which will deteriorate unless the cell be connected frequently in circuit. Inasmuch as it is undesirable to retain the cell in circuit at all times, because of the continuous flow of energy therethrough and the objectionable wear upon the electrodes, I have provided a device which will automatically and intermittently operate to charge electrolytic lightning arresters mounted upon railway cars and similar vehicles.

Figure 1:
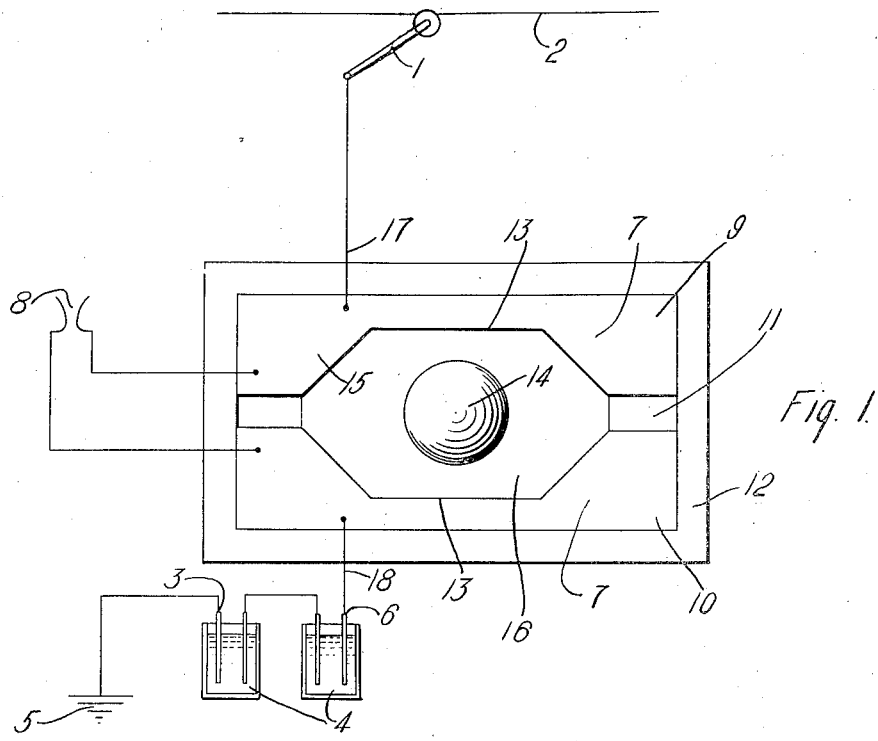
Figure 2:
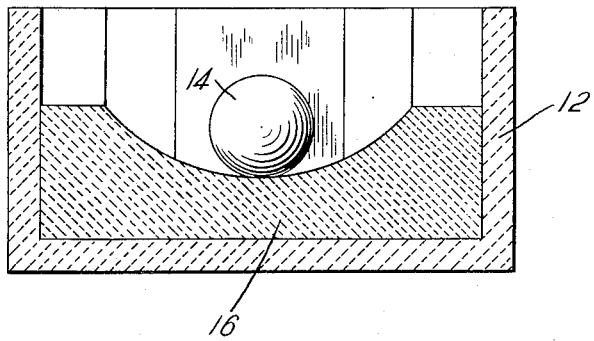

For a better understanding of the nature, the scope and the characteristic features of my invention, reference may be had to the following description and the accompanying drawing forming a part hereof in which Figure 1 is a top plan view of an embodiment of my invention, a diagrammatic view of circuits and circuit connections and two electrolytic lightning arrester cells; and Fig. 2 is a sectional view of the device shown in Fig. 1.

Referring to Fig. 1, a trolley pole 1, that is mounted upon a movable car (not shown), conducts power from a line conductor 2 to the propelling apparatus (not shown) of the car. One terminal 3 of electrolytic lightning arrester cells 4, which are of the type requiring intermittent charging, is connected to the ground connection 5, which, in an electric car, is usually and preferably formed by the contact of the car wheels with the grounded rails. In the drawing, I have shown the cells 4 connected in series relation, but this particular connection is not essential, the connection to be employed being dependent upon the design of the cells, the use to which they may be adapted, and the operating voltage upon the conductor 2. The other terminal 6 of the cells 4 is connected, through one member of a charging device 7, to a discharge member of a horn gap arrester 8. The other coöperating discharge member of the horn gap arrester is connected to the charging device 7 and to the trolley pole 1.

High-potential disturbances occurring upon the line conductor 2, which are occasioned by lightning discharges, short circuits, bad motor commutation, etc., will discharge across the members of the horn gap 8 and will freely pass through the cells 4 to the ground connection 5, if the voltage of the disturbances exceeds the critical voltage of the electrolytic arrester which comprises the cells 4. Free passage of current through the electrolytic arrester will continue so long as a spark exists across the horn gap 8, and while the potential above ground of the conductor 2 exceeds the critical voltage of the electrolytic cell combination. When the discharge has passed to ground, and the normal operating conditions of the circuit have been restored, the insulating films will immediately reform upon the electrodes of the cells 4, thereby preventing the further flow of electric current to ground.

In order to charge the cells 4 so that they may be maintained in proper operating conditions at all times, I provide the device 7 that comprises two similar and oppositely disposed electrodes 9 and 10 which are spaced apart to form air gaps 11 having a break-down voltage which has a value considerably above that of the horn gap 8. The metallic electrodes 9 and 10 are contained within a box 12 made of some insulating material and having a cover which is not shown. Each of the electrodes 9 and 10 is provided at its central portion with a side recess 13 which permits a metallic ball 14 to be interposed without electrically connecting the electrodes 9 and 10 to each other. The electrodes have laterally and inwardly extending end portions 15 between which are formed the air gaps 11, the gaps being of such dimensions as to be bridged by the ball 14 when it advances or recedes from its normal and inoperative position. The ball 14 is movably positioned upon the concave top surface of an insulating base 16, substantially as shown in Fig. 2.

Inasmuch as the device 7 is mounted upon a movable car, in conjunction with the horn gap arrester 8 and the electrolytic cells 4, the metal ball 14 will be maintained in its central position, as shown in the figures, when the car is stationary or traveling at a substantially constant speed. This results from the form of the surface upon which the ball 14 rests. When the car is ascending or descending from a grade, or accelerating or decelerating at or above a certain rate, the ball, by reason of its inertia, will roll either backward or forward, as the case may be, upon the base 16. If the force imparted to the ball is sufficiently large, it will bridge one of the air gaps 11 and remain there until the car has attained a uniform grade or a constant speed, when the ball will return to its inoperative central position.

It will be noted that the air gaps 11 are connected in shunt relation to the horn gap 8, and, therefore, when one of the air gaps is bridged by the metallic ball 14, the electrolytic cells 4 are connected to the power conductor 2, thus permitting a small charging current to flow from the conductor through the trolley 1, a conductor 17 and the electrode 9, the metallic ball 14 which bridges the air gap 11, the electrode 10, a conductor 18, and the cells 4 to the ground connection 5.

It is apparent from the foregoing description that, by means of the charging device 7, the electrolytic cells may be automatically and intermittently charged by the momentary bridging of the air gaps 11 by the metallic ball 14. Further, the charging device is of such construction that no personal attendance is required to maintain it in effective working condition at all times. I prefer that the main discharge gap provided by the horn gap 8, be separate from the air gap 11, inasmuch as the horn gap will operate when a high potential discharge passes to ground and thereby prevent the pitting of the electrodes 9 and 10.

While my invention is particularly adapted to be applied to electric railway vehicles, it will be readily understood that it may be applied to other apparatus and used for other purposes than herein described, and that the arrangements and structural details of my device may be considerably varied from what has been shown and described, without altering the mode of operation of my invention or departing from its spirit, and I desire that such modifications shall be included within its scope.

I claim as my invention:

1. An inertia-actuated circuit-closing device comprising spaced electrodes having recessed central portions, a movable metallic sphere normally out of contact with said electrodes and interposed adjacent to the said recessed portions, and an insulating base member having a concave surface upon which said sphere is adapted to roll under the influence of its own inertia for establishing a circuit between said electrodes.

2. An inertia-actuated charging device comprising oppositely disposed electrodes spaced apart to form air gaps, a movable metallic sphere interposed between the said electrodes, and an insulating base member having a concave surface upon which said sphere is adapted to normally rest in a position out of simultaneous contact with said electrodes and to move to a position in contact with all of said electrodes under the influence of its own inertia.

3. An inertia-actuated circuit-closing device comprising two spaced electrodes, the opposing faces of which have recesses, an insulating base member having a concave surface disposed between the recessed portions of said electrodes, and a metallic sphere movably positioned upon the concave surface of said base, which is so shaped as to normally retain the sphere out of simultaneous contact with both of said electrodes.

4. An inertia-actuated circuit-closing device comprising two spaced electrodes the opposing surfaces of which have recesses, an interposed insulating base member having a concave surface between the recessed portions of said electrodes, a movable conducting sphere positioned upon the concave surface of said base member, said concave surface causing said sphere to be normally out of simultaneous contact with both of said electrodes and to connect the said electrodes to each other when the circuit closer is subjected to periods of acceleration and deceleration.

5. An inertia-actuated charging device comprising two spaced electrodes the opposing surfaces of which are provided with recesses, an insulating base member provided with a concave surface interposed between the recessed portions of said electrodes, said recessed portions converging at the higher points on said concave surface and diverging at the lower points, and a metallic sphere movable upon said concave surface and normally in the lower portion thereof and out of simultaneous engagement with both of said electrodes and actuated to bridge one of the gaps between the electrodes only when the charging device is subjected to periods of acceleration and deceleration.

6. An inertia-actuated charging device comprising two stationary electrodes spaced apart to form an air gap, an insulating block interposed between the lower portions of said electrodes, and a movable conducting member positioned upon said block which is so shaped as to cause said movable conducting member to be normally out of simultaneous engagement with both electrodes and to be responsive to accelerating or decelerating movements imparted to the charging device for bridging the said air gap.

7. A charging device comprising two stationary electrodes spaced apart to form an air gap, an insulating base member provided with a concave surface interposed between the lower portions of said electrodes, and a metallic sphere normally resting in the lowest portion of said concave surface and out of simultaneous engagement with both of said electrodes and actuated by accelerating or retarding movements of the charging device to move to the upper portions of said concave surface and thereby bridge said air gap.

8. In a vehicle adapted for operation on a roadway having a predetermined ruling grade, the combination with spaced electrodes, of a base member interposed between said electrodes and provided with opposing inclined faces, the inclination of which is greater than that of said ruling grade, a conducting member adapted to move on said inclined faces and into simultaneous contact with said electrodes under the influence of inertia, and an electrical circuit connected to said electrodes.

9. The combination with a structure subject to abrupt acceleration and deceleration in a substantially horizontal plane, of means providing an electric conducting path thereon and a circuit-closing device inserted in said path, said device comprising a pair of spaced electrodes mounted in fixed relation to each other, a bridging member adapted to make contact therebetween, said elements being capable of relative movement under the influence of inertia.

In testimony whereof, I have hereunto subscribed my name this 30th day of August, 1913.

QUINCY A. BRACKETT.

Witnesses:
B. H. SMITH,
B. B. HINES.